United States Patent
Kurokawa et al.

(10) Patent No.: US 11,352,472 B2
(45) Date of Patent: Jun. 7, 2022

(54) PREPREG, FIBER-REINFORCED COMPOSITE MATERIAL AND SURFACE-MODIFIED REINFORCING FIBERS

(71) Applicant: TEIJIN LIMITED, Osaka (JP)

(72) Inventors: Kazuma Kurokawa, Chiyoda-ku (JP); Tetsuya Akamatsu, Chiyoda-ku (JP); Hiroaki Kuwahara, Chiyoda-ku (JP)

(73) Assignee: TEIJIN LIMITED, Osaka (JP)

( * ) Notice: Subject to any disclaimer, the term of this patent is extended or adjusted under 35 U.S.C. 154(b) by 0 days.

(21) Appl. No.: 16/093,367

(22) PCT Filed: Apr. 13, 2017

(86) PCT No.: PCT/JP2017/015161
§ 371 (c)(1),
(2) Date: Oct. 12, 2018

(87) PCT Pub. No.: WO2017/179666
PCT Pub. Date: Oct. 19, 2017

(65) Prior Publication Data
US 2019/0062511 A1    Feb. 28, 2019

(30) Foreign Application Priority Data

Apr. 13, 2016 (JP) .............................. JP2016-080403
Mar. 10, 2017 (JP) ................................. 2017-046796

(51) Int. Cl.
*C08J 5/24* (2006.01)
*B32B 27/12* (2006.01)
*C08J 5/06* (2006.01)

(52) U.S. Cl.
CPC ................. *C08J 5/24* (2013.01); *B32B 27/12* (2013.01); *C08J 5/06* (2013.01); *B32B 2262/106* (2013.01);
(Continued)

(58) Field of Classification Search
CPC ............... B29C 70/882; Y10S 428/929; Y10S 428/931; D06M 11/74; D06M 11/83;
(Continued)

(56) References Cited

U.S. PATENT DOCUMENTS

2008/0295955 A1   12/2008   Cawse et al.
2010/0178487 A1    7/2010   Arai et al.
(Continued)

FOREIGN PATENT DOCUMENTS

CA       2953910 A1 *  2/2016  ................ C08J 5/24
EP     2 053 078 A1    4/2009
(Continued)

OTHER PUBLICATIONS

Toho Tenax IMS60, material data sheet, accessed online Apr. 1, 2020.*
(Continued)

*Primary Examiner* — Camie S Thompson
(74) *Attorney, Agent, or Firm* — Norris McLaughlin, P.A.

(57) ABSTRACT

The present invention provides a prepreg which is composed of at least a matrix resin and reinforcing fibers, and which is characterized in that: conductive parts are formed on one surface or both surfaces of a fiber layer that is formed of the reinforcing fibers; and the volume resistivity ρ (Ωcm) of the fiber layer in the thickness direction, the thickness t (cm) of the fiber layer and the average interval L (cm) between the conductive parts arranged on the prepreg surface satisfy formula (1).

$$t/\rho \times 1/L \times 100 \geq 0.5 \quad \text{Formula (1):}$$

4 Claims, 1 Drawing Sheet

(52) U.S. Cl.
CPC ..... *B32B 2305/076* (2013.01); *B32B 2305/34* (2013.01); *B32B 2307/202* (2013.01); *C08J 2300/12* (2013.01); *C08J 2300/22* (2013.01)

(58) Field of Classification Search
CPC .............. B82Y 30/00; B29K 2105/089; B29K 2307/04; B29K 2995/0005; B29B 11/16; B32B 2260/046; B32B 2260/023; B32B 2260/021; B32B 2262/106; B32B 2307/202; B32B 2307/212; B32B 5/26; B32B 5/24; B32B 5/28; B32B 5/30; B32B 2264/0214; B32B 2264/105; B32B 2264/10; B32B 2264/12; B32B 27/38; B32B 2305/076; Y10T 428/25; Y10T 428/254; Y10T 428/24; Y10T 428/24994; Y10T 428/249942; Y10T 428/249948; Y10T 428/24995; Y10T 428/24372; Y10T 428/249924; Y10T 442/2016; Y10T 442/209; Y10T 442/2107; Y10T 442/2115; Y10T 442/2123; C08J 5/24; C08J 5/042; C08J 5/06; C08J 5/10; C08J 5/005
USPC ....... 428/323, 300.1, 292.1, 327, 411.1, 143; 428/172, 297.4, 98; 156/276, 60; 252/500, 511; 442/110, 111, 393, 61, 70, 442/72, 73, 74; 264/112; 977/34
See application file for complete search history.

(56) References Cited

U.S. PATENT DOCUMENTS

| | | |
|---|---|---|
| 2012/0141763 A1 | 6/2012 | Cawse et al. |
| 2015/0274911 A1 | 10/2015 | Suzuki et al. |
| 2018/0208729 A1 | 7/2018 | Korokawa et al. |

FOREIGN PATENT DOCUMENTS

| | | | |
|---|---|---|---|
| EP | 2 540 491 A2 | 1/2013 | |
| EP | 2 902 435 A1 | 8/2015 | |
| JP | 2008-231395 A | 7/2010 | |
| JP | 2011-058117 A | 3/2011 | |
| JP | 2013-503930 A | 2/2013 | |
| JP | 2015-107651 A | 6/2015 | |
| JP | 2015-166464 A1 | 9/2015 | |
| WO | 2014/011293 A2 | 1/2014 | |
| WO | 2015/047605 A1 | 4/2015 | |
| WO | 2016/017553 A1 | 2/2016 | |
| WO | WO-2016017553 A1 * | 2/2016 | .............. B32B 5/26 |

OTHER PUBLICATIONS

International Search Report dated Jun. 21, 2017, dated Jul. 4, 2017.
English Translation of International Search Report dated Jun. 21, 2017, dated Jul. 4, 2017.

* cited by examiner

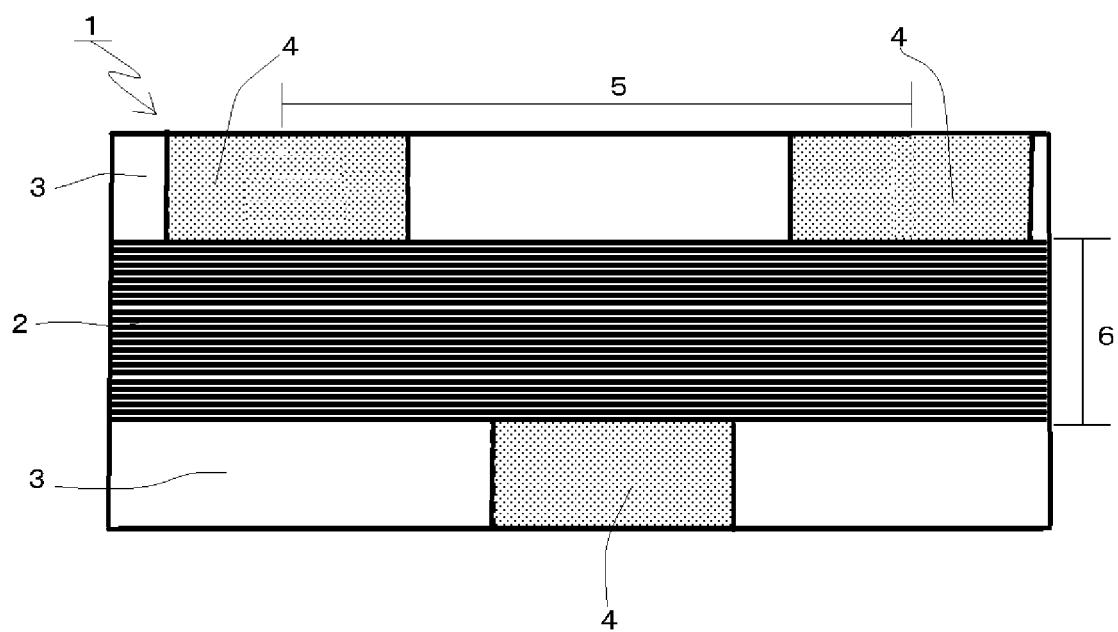

PREPREG, FIBER-REINFORCED COMPOSITE MATERIAL AND SURFACE-MODIFIED REINFORCING FIBERS

This application is a 371 application of PCT/JP2017/015161 filed Apr. 13, 2017, which claims foreign priority benefits under 35 U.S.C. § 119 of Japanese Application Nos. 2016-080403 filed Apr. 13, 2016 and 2017-046796 filed Mar. 10, 2017, the disclosures of each of which are incorporated by reference herein in their entirety.

TECHNICAL FIELD

The present invention relates to a prepreg capable of suppressing a fiber-reinforced composite material from being damaged by a discharge, a fiber-reinforced composite material obtained by using the prepreg, and a surface-modified reinforcing fiber having excellent conductivity, used for the prepreg.

BACKGROUND ART

A fiber-reinforced composite material (hereinafter, referred to as a composite material) made of reinforcing fibers and a matrix resin has features such as a light weight, high strength, a high elastic modulus and the like, and is widely applied to aircraft, sports, leisure, and general industries. The composite material is often manufactured by using a prepreg in which the reinforcing fibers and a matrix resin are integrated in advance. There are cases where the composite material is applied with a current or voltage in use. The cases are, for example, lightning strikes in the case in which the composite material is used in a structural material of an aircraft or wind power generation apparatus, and accumulation of static electricity in the case in which the composite material is used in a substrate of an integrated circuit. When the composite material is applied with the current or voltage, the composite material can be damaged by a discharge.

A composite material manufactured by stacking a prepreg in which reinforcing fibers are impregnated with a matrix resin generally has a resin layer made of a matrix resin between stacked fiber layers. Generally, it is known that since the matrix resin used for the composite material has low conductivity, even if a fiber having conductivity is used for the reinforcing fiber, conductivity of the composite material is decreased by the resin layer between the fiber layers in a thickness direction (a direction perpendicular to a surface of each layer). Therefore, in particular, various studies have been made to improve the conductivity of the composite material in the thickness direction, in order to prevent the composite material from being damaged by a discharge.

As a method of improving conductivity of a composite material in a thickness direction, a method of improving conductivity of a resin layer of a composite material by blending particles having conductivity such as metal particles, carbon particles or the like in a matrix resin composition (for example, Patent Literatures 1 and 2) and a method of forming a conductive path of a resin layer of a composite material by disposing a conductive material on a surface of a prepreg (for example, Patent Literature 3) are proposed.

However, even though conductivity of the composite material in the thickness direction is improved by these methods, in the case in which a high voltage or the like is applied to the composite material, a discharge still occurs in the fiber layer or the like of the composite material, such that these materials were insufficient to prevent the composite material from being damaged by the discharge.

For this reason, a prepreg capable of suppressing a composite material from being damaged by a discharge has been required.

CITATION LIST

Patent Literature

Patent Literature 1: JP 2008-231395 A
Patent Literature 2: JP 2013-503930 W
Patent Literature 3: WO 2016/017553 A

SUMMARY OF INVENTION

Technical Problem

An object of the present invention is to solve the above-described problem in the related art, and provide a prepreg capable of suppressing a fiber-reinforced composite material from being damaged by a discharge.

Solution to Problem

A prepreg of the present invention which solves the above-described problem is a prepreg including: at least reinforcing fibers; and a matrix resin, wherein conductive parts are formed on one surface or both surfaces of a fiber layer made of the reinforcing fibers, and a volume resistivity $\rho$ ($\Omega$cm) of the fiber layer in a thickness direction, a thickness $t$ (cm) of the fiber layer, and an average interval $L$ (cm) of the conductive parts formed on the surface of the prepreg satisfy the following Equation (1):

$$t/\rho \times 1/L \times 100 \geq 0.5 \qquad \text{Equation (1).}$$

In the present invention, the volume resistivity $\rho$ of the fiber layer in the thickness direction is preferably 50 $\Omega$cm or less. The average interval $L$ of the conductive part is preferably 0.025 cm or more. The conductive part is configured to contain a conductive material A. In addition, the reinforcing fiber used in the present invention is preferably a reinforcing fiber in which a conductive material B is adhered to a fiber surface. The conductive materials A and B are described below. It is preferable that the fiber layer contains the conductive material B existing between single fibers of the reinforcing fibers. In addition, it is preferable to use a surface-modified reinforcing fiber composed of the reinforcing fiber and an organometallic complex adhered to the surface of the reinforcing fiber and/or an organometallic complex pyrolysate.

The present invention includes a fiber-reinforced composite material obtained by using the prepreg of the present invention. The present invention also includes a surface-modified reinforcing fiber obtained by adhering an organometallic complex and/or an organometallic complex pyrolysate to a surface of a reinforcing fiber.

Advantageous Effects of Invention

In a prepreg of the present invention, a predetermined conductive part is formed. For this reason, the fiber-reinforced composite material manufactured by curing the prepreg can suppress damage due to a discharge.

Since in a surface-modified reinforcing fiber of the present invention, an organometallic complex and/or an organometallic complex pyrolysate is adhered to a surface thereof, the surface-modified reinforcing fiber has high conductivity. The prepreg manufactured by using the surface-modified reinforcing fiber can be used to manufacture a fiber-reinforced composite material having high conductivity.

Since the fiber-reinforced composite material of the present invention has excellent conductivity to suppress damage due to the discharge, the fiber-reinforced composite material can be applied for various applications requiring electromagnetic shielding, electrostatic protection, current return, and conductivity.

BRIEF DESCRIPTION OF DRAWINGS

FIG. 1 is a conceptual diagram illustrating an example of a prepreg of the present invention.

REFERENCE SIGNS LIST

1 Prepreg
2 Fiber layer
3 Resin layer
4 Conductive part
5 Interval of conductive part
6 Thickness (t) of fiber layer

DESCRIPTION OF EMBODIMENTS

1. Prepreg

Hereinafter, a prepreg of the present invention is described. In the following description, unless otherwise described, a volume means a volume at 25° C. The prepreg of the present invention is a prepreg including: at least reinforcing fibers; and a matrix resin. Conductive parts are formed on one surface or both surfaces of a fiber layer made of the reinforcing fibers. The prepreg is a prepreg of which a volume resistivity $\rho$ ($\Omega$cm) in a thickness direction, a thickness t (cm) of the fiber layer, and an average interval L (cm) of the conductive parts disposed on the surface of the prepreg satisfy the following Equation (1):

$$t/\rho \times 1/L \times 100 \geq 0.5 \qquad \text{Equation (1)}.$$

Since a composite material obtained by using the prepreg of the present invention satisfying Equation (1) can disperse and suppress a voltage applied to the fiber layer to a low level even in the case in which a high current or voltage is applied thereto, it is possible to suppress a discharge in the fiber layer. For this reason, with the prepreg of the present invention, it is possible to suppress the composite material from being damaged by the discharge.

An upper limit value of $t/\rho \times 1/L \times 100$ is not particularly limited, but an upper limit value of 5000 is enough. More preferably, a value of $t/\rho \times 1/L \times 100$ is 0.8 or more to 2000 or less.

Hereinafter, an embodiment of the present invention is described in detail with reference to the accompanying drawing. FIG. 1 is a conceptual diagram illustrating a preferable embodiment of the prepreg of the present invention. In FIG. 1, reference numeral [1] indicates a prepreg, which is configured of a fiber layer [2] in which reinforcing fibers are impregnated with a matrix resin and a resin layer [3] made of the matrix resin disposed on a surface of the fiber layer, and a plurality of conductive parts [4] are formed in the resin layer. In FIG. 1, the reinforcing fiber is formed in a sheet shape in which a plurality of single fibers are aligned in one direction.

In the present invention, the conductive part [4] disposed on the surface of the fiber layer is formed to contain a conductive material A described below. The conductive material A is a conductive substance functioning as an electrically good conductor and is a specific conductive substance having a volume resistivity of preferably 100 to $10^{-9}$ $\Omega$cm, more preferably 10 to $10^{-9}$ $\Omega$cm, and further more preferably 1 to $10^{-9}$ $\Omega$cm, and particularly preferably $10^{-1}$ to $10^{-9}$ $\Omega$cm. When the volume resistivity is low, it is possible to more efficiently improve conductivity of a composite material to be obtained. As an example of the conductive material A, a metal material, a carbon material, a conductive polymer, a material obtained by coating a core material of an inorganic material or organic material with a conductive substance, or the like, can be used. Among them, the metal material and the carbon material are preferable in that the metal material and the carbon material have high conductivity and stability.

A distance [5] from a central point of a conductive part [4] to a central point of another conductive part [4] that is closest and adjacent thereto on the same surface of the prepreg is an interval of the conductive parts. In the case in which two conductive parts [4] come in contact with each other or the case in which two conductive parts [4] are in a distance at which electrical conduction occurs, these conductive parts are regarded as forming one conductive part. In the present invention, an end portion of the conductive part [4] and an end portion of another conductive part [4] closest and adjacent thereto is spaced part from each other at an interval of preferably 0.001 cm or more, more preferably 0.005 cm or more. Further, the average interval L of the conductive part is preferably 0.025 cm or more, more preferably 0.05 cm or more, and further more preferably 0.1 cm or more. The average interval L is preferably 2.0 cm or less, and more preferably 1.0 cm or less.

As a formation pattern of the conductive parts [4], for example, the conductive parts [4] can be continuously arranged in a linear shape or a lattice shape, or discontinuously arranged in a dot shape or an island shape. It is particularly preferable that the conductive parts [4] are discontinuously arranged. When the conductive parts are discontinuously arranged, each of the dots or islands may be arranged in rows in a lattice shape, a zigzag shape, a circular shape, or the like, or may be randomly arranged.

When the conductive parts [4] are continuously arranged in the linear shape or lattice shape, the central point of the conductive part [4] is a central point of a line width thereof. When the conductive parts [4] are discontinuously arranged in the dot shape or island shape, the central point of the conductive part [4] is a central point of the smallest circumcircle circumscribing the conductive part [4].

When the conductive part [4] has predetermined length and is formed in a continuous shape, a width thereof on a bottom surface (meaning an interface with the fiber layer, the same shall apply hereinafter) is preferably 1 μm to 5 mm, and more preferably 10 μm to 1 mm.

When the conductive parts [4] are discontinuously arranged, a shape of the bottom surface is not particularly limited, but the conductive part can have any shape such as a circle, an ellipse, a square, a polygon, a star, an irregular shape or the like. Further, in view of a size, a diameter of the circumcircle on the bottom surface is preferably 0.1 μm to 5 mm, more preferably 1 μm to 1 mm, and further more preferably 10 to 500 μm. In addition, an area of the bottom surface of each conductive part [4] is preferably 0.01 to 500,000 μm$^2$, more preferably 0.1 to 100,000 μm$^2$, and further more preferably 1 to 10,000 μm$^2$.

A height of the conductive part [4] is not particularly limited. In the case of blending particles insoluble in the matrix resin (this is described later), it is preferable that the height of the conductive part is higher than an average particle diameter. The height of the conductive part [4] (a length in a direction extended in a thickness direction of the prepreg) may be appropriately adjusted corresponding to a thickness of the prepreg or the resin layer, but it is preferable that the height is 80% or more of the thickness of the resin layer. More specifically, the height of the conductive part [4] is preferably 1 to 3000 μm and more preferably 2 to 300 μm. A three-dimensional shape of the conductive part [4] is not particularly limited, and the conductive part [4] can have any shape such as a cylindrical shape, a prismatic shape, a conical shape, a pyramidal shape, a hemispherical shape, a semi-ellipsoidal shape or the like. The cylindrical shape, the prismatic shape, the hemispherical shape and the semi-ellipsoidal shape are preferable in that a difference in contact area between one fiber layer and another fiber layer is small at the time of stacking the prepreg. In the case of continuously disposing a conductive material or a conductive paste, it is preferable to dispose the conductive material or the conductive paste so that a cross-sectional shape thereof in a width direction is a square shape, a trapezoidal shape, a circular shape, a semicircular shape, or a semielliptic shape.

Further, in view of easily achieving both the conductivity and the mechanical strength of the composite material, a volume of a single conductive part disposed on the surface of the prepreg is preferably 0.1 $\mu m^3$ to 1 $mm^3$, more preferably 0.5 $\mu m^3$ to 0.5 $mm^3$, and further more preferably 1 $\mu m^3$ to 0.1 $mm^3$.

It is preferable that the conductive parts [4] are formed in substantially the same shape as each other. Here, substantially the same shape means that each conductive part [4] has a size or a height in a range within ±50% of the average value. Similarly, it is preferable that each conductive part [4] is formed at a substantially equal interval. Here, the substantially equal interval means that the interval between the conductive parts [4] is in a range within ±50% of the average value L.

In addition, a volume occupation ratio of the conductive material A constituting the conductive part [4] in the matrix resin of the prepreg is preferably 50 vol % or less, more preferably 10 vol % or less and further more preferably 5 vol % or less in view of mechanical properties of the composite material. A lower limit of the volume occupation ratio is not particularly limited, but in view of the conductivity of the obtained composite material, the lower limit is preferably 0.0001 vol % or more, more preferably 0.0005 vol % or more, further more preferably 0.001 vol % or more, and most preferably 0.01 vol % or more.

In the present invention, the volume resistivity ($\rho$) of the fiber layer in the thickness direction is preferably 50 Ωcm or less, more preferably 25 Ωcm or less, and further more preferably 15 Ωcm or less. The volume resistivity ($\rho$) of the fiber layer in the thickness direction can be adjusted, for example, by a method of changing conductivity of the reinforcing fiber itself or a method of disposing a conductive material B between single fibers of the reinforcing fiber or the like. As the method of disposing the conductive material B between the single fibers of the reinforcing fiber, for example, there are a method of adhering the conductive material B to a surface of the fiber and a method of mixing the conductive material B to the matrix resin of the fiber layer. In view of the mechanical properties of the obtained composite material, the reinforcing fiber in which the conductive material B is adhered to the surface of the fiber is preferably used.

In the present invention, the thickness t of the fiber layer is not particularly limited, but is preferably 0.01 to 3 mm, and more preferably 0.1 to 1.5 mm. The thickness t of the fiber layer can be appropriately adjusted by a method of performing opening treatment on the reinforcing fiber, a method of changing a fiber basis weight or the like.

Since in the prepreg of the present invention described above, a discharge in the resin layer and the fiber layer can be suppressed, damage of the composite material due to the discharge can be suppressed.

Each component used in the prepreg of the present invention is described in detail below.

(1-1) Reinforcing Fiber

The fiber used as the reinforcing fiber is not particularly limited, and examples thereof include carbon fiber, glass fiber, aramid fiber, polyester fiber, ceramic fiber, alumina fiber, boron fiber, silicon carbide fiber, mineral fiber, rock fiber, slag fiber and the like. In the present invention, in view of conductivity of the fiber layer, conductive fiber is preferable. Examples of the conductive fiber include carbon fiber, silicon carbide fiber, and metal fiber. Further, it is also possible to use a reinforcing fiber of which a surface is coated with a conductive substance by a method such as metal plating treatment or the like.

Among these reinforcing fibers, carbon fiber is more preferable in that it is possible to obtain a composite material having a light weight and high strength while having good specific strength and specific elastic modulus. Particularly, polyacrylonitrile (PAN) based carbon fiber is preferable in view of excellent tensile strength.

In the case of using the PAN based carbon fiber, a tensile elastic modulus thereof is preferably 100 to 600 GPa, more preferably 200 to 500 GPa, and further more preferably 230 to 450 GPa. Further, the tensile strength thereof is 2000 MPa to 10000 MPa, preferably 3000 to 8000 MPa. A diameter of the carbon fiber is preferably 4 to 20 μm, and more preferably 5 to 10 μm. Mechanical properties of the obtained composite material can be improved by using the carbon fiber as described above.

In order to improve conductivity of the fiber layer of the prepreg, it is preferable to use a reinforcing fiber in which the conductive material B is adhered to the surface of the fiber as the reinforcing fiber. The conductive material B to be adhered to the surface of the reinforcing fiber may be a conductive substance functioning as an electrically good conductor, but is not limited to a conductor. Preferably, the conductive material is a conductive substance having a volume resistivity of $10^{-1}$ to $10^{-9}$ Ωcm. When the volume resistivity is low, it is possible to more efficiently improve conductivity of the fiber layer. The same conductive material as the conductive material A used for manufacturing the conductive part formed on the surface of the prepreg may be used. An amount of the conductive material B adhered to the reinforcing fiber is preferably 0.01 to 5 mass % and more preferably 0.05 to 3 mass %.

As the conductive material B to be adhered to the surface of the reinforcing fiber, a conductive material B having a minimum diameter smaller than a fiber diameter of the used reinforcing fiber to be used is preferably used. When the minimum diameter of the conductive material B is smaller than the fiber diameter of the reinforcing fiber to be used, since the conductive material B easily enters between single fibers of the reinforcing fiber, the conductivity of the fiber layer can be further enhanced. The conductive material B to be adhered to the surface of the reinforcing fiber is a conductive material having a minimum diameter of preferably 1 nm to 3 µm, more preferably 5 nm to 1 µm, and further more preferably 10 nm to 0.5 µm.

As a method of adhering the conductive material B to the surface of the reinforcing fiber, for example, there are a method of directly spraying the conductive material B on a reinforcing fiber substrate and a method of immersing the reinforcing fiber in a solution containing the conductive material B. The method of immersing the reinforcing fiber in the solution containing the conductive material B is preferable in that the conductive material B can be adhered to the inside of a reinforcing fiber bundle. In the case of using the solution containing the conductive material B, the solution may be a solution containing a sizing agent. In the case of using the solution containing the sizing agent, it is difficult to desorb the conductive material B from the reinforcing fiber in a process of manufacturing the prepreg. Further, it is preferable to attaching a fixing agent after adhering the conductive material B to the surface of the reinforcing fiber.

Although the sizing agent is not particularly limited, generally, the sizing agent is the same kind of resin as a resin used in a molding material such as polyalkylene glycol, a polyurethane resin, polyolefin, a vinyl ester resin, a saturated polyester res in, an unsaturated polyester resin, a polyamide resin, a polyimide resin, a polyamideimide resin, an acrylic resin, an epoxy resin, a phenol resin and the like. One of these resins may be used alone or a combination of two or more thereof may also be used. Further, a surfactant or the like may be added for dispersion in water.

As the reinforcing fiber used in the prepreg of the present invention, particularly, a surface-modified carbon fiber described below is preferably used.

It is preferable to use the reinforcing fiber formed in a sheet-shaped substrate. Examples of a reinforcing fiber substrate sheet can include a sheet in which a large number of fibers are aligned in one direction, a bi-directional woven fabric such as a plain weave fabric or a twill weave fabric, a multi-axis woven fabric, a non-woven fabric, a mat, a knit, a braid, paper made using a reinforcing fiber, and the like.

A thickness of the sheet-shaped reinforcing fiber substrate is preferably 0.01 to 3 mm, and more preferably 0.1 to 1.5 mm. These reinforcing fiber substrate sheets may contain a known sizing agent in a known content.

(1-2) Conductive Material

As the conductive material used as the conductive materials A and B of the present invention, a conductive substance functioning as an electrically good conductor is preferably used, but is not limited to a conductor. Preferably, the conductive material is a conductive substance having a volume resistivity of preferably 100 to $10^{-9}$ Ωcm, more preferably 10 to $10^{-9}$ Ωcm, and still more preferably 1 to $10^{-9}$ Ωcm, and particularly preferably $10^{-1}$ to $10^{-9}$ Ωcm. When the volume resistivity is low, it is possible to more efficiently improve conductivity of the composite material to be obtained.

As the conductive material used in the present invention, a conductive material whose minimum diameter is smaller than the fiber diameter of the reinforcing fiber to be used is preferable. When the minimum diameter of the conductive material is smaller than the fiber diameter of the reinforcing fiber to be used, the conductive material is likely to enter between the single fibers of the reinforcing fiber. In the case of using the conductive material as the conductive material A, since the conductive part is likely to come in close contact with the fiber layer, conductivity of the obtained composite material can be further improved. Further, in the case of using the conductive material as the conductive material B, since the conductive material entering between the single fibers is likely to come in contact with a plurality of fibers, conductivity of the fiber layer can be further improved. The conductive material used in the present invention is a conductive material having a minimum diameter of preferably 1 nm to 3 µm, more preferably 5 nm to 1 µm, and further more preferably 10 nm to 0.5 µm.

As an example of the conductive material, a metal material, a carbon material, a conductive polymer, a material obtained by coating a core material of an inorganic material or organic material with another conductive substance, or the like, can be used. Further, in the pre sent invention, the conductive material used in the prepreg may be a conductive substance which functions as a conductor with good electrical conductivity after being formed into a composite material and may also be a substance converted into the conductor at a molding temperature of the composite material. The molding temperature of the composite material is generally 80 to 300° C. Examples of the substance converted into the conductor at the above-mentioned temperature include organic metal compounds, organometallic complexes or the like.

Among the conductive materials, the metal material and the carbon material are preferable in that the metal material and the carbon material have high conductivity and stability.

As the metal material, platinum, gold, silver, copper, tin, nickel, titanium, cobalt, zinc, iron, chromium, and aluminum, alloys containing these metals as a main component, and the like, are preferable in that it is possible to prevent corrosion caused by a potential difference between the metal material and the reinforcing fiber. Further, tin oxide, indium oxide, indium tin oxide (ITO) and the like are also preferable. Among them, platinum, gold, silver, copper, tin, nickel, titanium and the alloys containing these metals as the main component are particularly preferable in that it exhibits high conductivity and chemical stability.

A form of the conductive material used in the present invention is not particularly limited, and a filler, a conductive material having a continuous form or the like can be used. In the present invention, it is preferable that the form of the conductive material is the filler in view of mechanical properties of the composite material to be obtained.

In the present invention, the filler means a material having a discontinuous form and having an aspect ratio of preferably 1 to 1000. As a filler type conductive material, for example, particulate, fibrous, star shaped conductive materials can be used. When a particulate filler is used, an average particle diameter of the particulate filler is not limited as long as it has a size enough to fill in the matrix resin of the prepreg, but is preferably 0.001 to 10 µm, more preferably 0.005 to 3 µm, further more preferably 0.01 to 1 µm, and particularly preferably 0.05 to 0.5 µm.

When a fibrous filler is used, a length of the fibrous filler is preferably 0.1 to 500 µm, more preferably from 1 to 20 µm. A diameter thereof is preferably 0.001 to 100 µm, more preferably 0.005 to 5 µm, further more preferably 0.01 to 1 µm, and particularly preferably 0.05 to 0.5 µm.

Examples of the metal material as the conductive filler can include metal particles, metal fibers, organometallic particles, organometallic complex particles, metal nanoparticles, metal nanofibers, organometallic nanoparticles, and the like. Examples of the carbon material can include graphite particles, carbon particles, carbon milled fibers, carbon black, carbon nanotubes, and vapor grown carbon fiber (VGCF).

As the carbon black, for example, furnace black, acetylene black, thermal black, channel black, ketjen black and the like can be used, and carbon black obtained by blending two or more of them can also be appropriately used.

As the conductive material having a continuous form, for example, a long fiber type or film type conductive material can be used. Examples of the conductive material having a continuous form can include carbon long fibers, metal long fibers, graphite films, metal foils, carbon nanocoils, metal nanowires, and the like.

An amount of the conductive material A added to the entire prepreg is preferably 20 mass % or less, more preferably 10 mass % or less, furthermore preferably 5 mass % or less, and particularly preferably 1 mass % or less. A lower limit of the amount of the conductive material A added to the entire prepreg is not particularly limited, but in view of conductivity of the composite material to be obtained, the lower limit is preferably 0.0005 mass % or more, and more preferably 0.001 mass % or more. Further, in the case of using a reinforcing fiber having the conductive material B adhered to the surface of the fiber as the reinforcing fiber, a total amount of the added conductive material A and the added conductive material B is preferably 20 mass % or less, more preferably 0.01 to 10 mass %, further more preferably 0.05 to 5 mass %, and particularly preferably 0.1 to 3 mass %, based on the entire prepreg. In addition, here, the amount of the added conductive material does not include a mass of the reinforcing fiber itself even though the reinforcing fiber has conductivity.

(1-3) Matrix Resin

The matrix resin used in the present invention is not particularly limited, and for example, a curable resin or a thermoplastic resin can be used. When the curable resin is used as the matrix resin, a composite material having high heat resistance can be manufactured, which is preferable. As a curable resin, in view of heat resistance and mechanical properties, it is preferable to use a thermosetting resin which at least partially forms a three-dimensional cross-linked structure through a cross-linking reaction by heat.

Examples of the curable resin used as the matrix resin include an unsaturated polyester resin, a vinyl ester resin, an epoxy resin, a bismaleimide resin, a benzoxazine resin, a triazine resin, a phenol resin, a urea resin, a melamine resin, a polyimide resin and the like. Further, modified products thereof, blended resins of two or more kinds of resins described above and the like can also be used. The curable resin may be a resin self-cured by heating, or may be a resin cured by blending a curing agent, a curing accelerator or the like.

Among the curable resins described above, the epoxy resin and the bismaleimide resin are preferable in that they are excellent in balance between heat resistance, mechanical properties and adhesion to carbon fibers. Particularly, the epoxy resin is more preferable in view of mechanical properties, and the bismaleimide resin is more preferable in view of heat resistance.

Examples of the epoxy resin are not particularly limited, but can include bifunctional epoxy resins such as a bisphenol type epoxy resin, an alcohol type epoxy resin, a biphenyl type epoxy resin, a hydrophthalic acid type epoxy resin, a dimer acid type epoxy resin, an alicyclic type epoxy resin; glycidyl ether type epoxy resins such as tetrakis(glycidyl oxyphenyl)ethane, tris(glycidyl oxyphenyl)methane; glycidyl amine type epoxy resins such as tetraglycidyl diamino diphenyl methane, naphthalene type epoxy resins; a phenol novolac type resin corresponding to a novolac type epoxy resin; a cresol novolac type epoxy resin; and the like.

Further, polyfunctional epoxy resins such as phenol type epoxy resins and the like can be included. In addition, various modified epoxy resins such as urethane-modified epoxy resins, rubber-modified epoxy resins and the like can also be used.

Among them, it is preferable to use an epoxy resin having an aromatic group in a molecule thereof, more preferably, an epoxy resin having a glycidyl amine structure or a glycidyl ether structure in a molecule thereof. In addition, an alicyclic epoxy resin can also be appropriately used.

Examples of the epoxy resin having a glycidyl amine structure include various isomers of N,N,N',N'-tetraglycidyl diaminodiphenylmethane, N,N,O-triglycidyl-p-aminophenol, N,N,O-triglycidyl-m-aminophenol, N,N,O-triglycidyl-3-methyl-4-aminophenol and triglycidylaminocresol, and the like.

Examples of the epoxy resin having a glycidyl ether structure include a bisphenol A type epoxy resin, a bisphenol F type epoxy resin, a bisphenol S type epoxy resin, a phenol novolac type epoxy resin and a cresol novolac type epoxy resin.

If necessary, these epoxy resins may have a non-reactive substituent on an aromatic ring structure or the like. Examples of the non-reactive substituent include an alkyl group such as methyl, ethyl, isopropyl or the like, an aromatic group such as phenyl or the like, an alkoxyl group, an aralkyl group, a halogen group such as chlorine or bromine, and the like.

Examples of the bisphenol type epoxy resin include a bisphenol A type resin, a bisphenol F type resin, a bisphenol AD type resin, a bisphenol S type resin and the like. Specific examples thereof include jER 815 (trade name), jER 828 (trade name), jER 834 (trade name), jER 1001 (trade name), and jER 807 (trade name) which are manufactured by Japan Epoxy Resins Co., Ltd., Epomik R-710 (trade name) manufactured by Mitsui Petrochemical Industries, EXA 1514 (trade name) manufactured by Dainippon Ink & Chemicals, Inc., and the like.

Examples of the alicyclic epoxy resin include Araldite CY-179 (trade name), CY-178 (trade name), CY-182 (trade name), CY-183 (trade name) and the like, manufactured by Huntsman.

Examples of the phenol novolac type epoxy resin include jER 152 (product name) and jER 154 (trade name) manufactured by Japan Epoxy Resins Co., Ltd., DEN 431 (trade name), DEN 485 (trade name) and DEN 438 (trade name) manufactured by Dow Chemical Company, Epiclon N740 (trade name) manufactured by DIC Corporation, and the like. Examples of the cresol novolac type epoxy resin include Araldite ECN 1235 (trade name), ECN 1273 (trade name) and ECN 1280 (trade name) manufactured by Huntsman, EOCN 102 (trade name), EOCN 103 (trade name) and EOCN 104 (trade name) manufactured by Nippon Kayaku Co., Ltd., and the like.

Examples of various modified epoxy resins include Adeka resin EPU-6 (trade name) and EPU-4 (trade name) manufactured by Asahi Denka Co., Ltd. as urethane-modified bisphenol A epoxy resins.

One of the epoxy resins described above can be appropriately selected and used alone, or a mixture of two or more thereof can be used. Among them, as the bifunctional epoxy resins typified by the bisphenol type, there are resins of various grades ranging from a liquid to a solid depending on a difference in molecular weight. Therefore, it is advantageous to blend these resins in order to adjust a viscosity of the matrix resin for the prepreg.

Examples of the thermoplastic resin used as the matrix resin include a polyethylene resin, a polypropylene resin, a polyolefin based resin corresponding to a copolymer or blend thereof, an aliphatic polyamide based resin such as polyamide 66, polyamide 6, polyamide 12 and the like, a semi-aromatic polyamide based resin having an aromatic component as an acid component, an aromatic polyester based resin such as polyethylene terephthalate resin (PET) and polybutylene terephthalate resin (PBT), a polycarbonate based resin, a polystyrene based resin (a polystyrene resin, an AS resin, an ABS resin or the like), or an aliphatic polyester based resin such as a polylactic acid based resin or the like.

(1-4) Other additives of Matrix Resin Composition

[Particles Insoluble in Matrix Resin]

A matrix resin composition of the present invention may contain particles insoluble in the matrix resin. The particles insoluble in the matrix resin remain on the surface of the reinforcing fiber sheet and tend to become interlayer particles at the time of preparing the prepreg. The interlayer particles suppress propagation of impact that fiber reinforced plastic (FRP) receives. As a result, impact resistance of the obtained FRP is improved. Examples of the particles insoluble in the matrix resin include inorganic particles, rubber particles, resin particles and the like. In view of mechanical properties of the composite material, particles made of a thermoplastic resin insoluble in the matrix resin as described below are preferable.

The particles insoluble in the matrix resin have an average particle diameter of preferably 1 to 50 μm and more preferably 3 to 30 μm.

[Curing Agent]

In the case of using the curable resin as the matrix resin, if necessary, a curing agent curing a resin may be blended in the matrix resin composition. As the curing agent, a known curing agent curing the matrix resin is used.

For example, as a curing agent used in the case in which an epoxy resin is used as the curable resin, dicyandiamide, various isomers of an aromatic amine based curing agent, and aminobenzoic acid esters can be used. Dicyandiamide is preferable in view of excellent storage stability of the prepreg. Further, aromatic diamine compounds such as 4,4'-diaminodiphenyl sulfone, 3,3'-diaminodiphenylsulfone, 4,4'-diaminodiphenylmethane, and derivatives thereof having non-reactive substituents are particularly preferable in that a cured product having excellent heat resistance is obtained. Here, the non-reactive substituent is the same as the non-reactive substituent described in the description of the epoxy resin.

As the aminobenzoic acid esters, trimethylene glycol di-p-aminobenzoate and neopentyl glycol di-p-aminobenzoate are preferably used. Composite materials cured by using these materials are inferior in heat resistance but excellent in tensile elongation as compared to various isomers of diaminodiphenyl sulfone. For this reason, the kind of curing agent to be used is appropriately selected depending on purposes of the composite material.

An amount of the curing agent contained in the matrix resin composition may be an amount enough to at least cure the matrix resin blended in the resin composition and may be appropriately adjusted depending on the kinds of matrix resin and curing agent to be used. A blending amount may be a desired blending amount appropriately determined in consideration of the presence or absence of the curing agent/curing accelerator and an addition amount thereof, a reaction stoichiometry with the curable resin, a curing rate of the composition and the like. In view of storage stability, it is preferable to blend 30 to 100 parts by mass, more preferably 30 to 70 parts by mass of the curing agent based on 100 parts by mass of the matrix resin contained in the resin composition.

As the curing agent, diaminodiphenyl sulfone (DDS) microencapsulated with a coating agent (for example, DDS coat 10 (manufactured by Matsumoto Yushi Co., Ltd.)) can also be used. In order to prevent a reaction with an uncured epoxy resin at room temperature, the microencapsulated DDS is which a surface layer of the DDS particle is coated with a material having a low reactivity with the epoxy resin, specifically, a coating material such as polyamide, a modified urea resin, a modified melamine resin, polyolefin, polyparaffin (including a modified product) and the like through a physical and chemical bond. These coating agents may be used alone or in combination, and DDS microencapsulated with various coating agents other than the above-mentioned coating agents can also be used.

[Thermoplastic Resin]

In the case in which a low viscosity resin is used as the matrix resin, a thermoplastic resin may be blended in order to impart an appropriate viscosity to the resin composition. The thermoplastic resin blended in the resin composition in order to adjust the viscosity also has an effect of improving mechanical properties such as impact resistance and the like of a composite material to be finally obtained.

An amount of the thermoplastic resin to be blended in the matrix resin composition is changed depending on the kind of matrix resin used in the resin composition and may be appropriately adjusted so that the viscosity of the resin composition will be an appropriate value described later. In general, it is preferable to blend the thermoplastic resin in an amount of 5 to 100 parts by mass based on 100 parts by mass of the matrix resin contained in the resin composition.

The viscosity of the matrix resin composition is preferably 10 to 450 poise, more preferably 50 to 400 poise in terms of a minimum viscosity at 80° C. When the minimum viscosity of the resin composition is 10 poise or more, an effect of suppressing outflow of the conductive material in a conductive region to localize the conductive material at a desired position of the prepreg is enhanced. The viscosity refers to a viscosity obtained from a temperature-viscosity curve measured using a rheometer. The viscosity of the matrix resin can be adjusted by the addition amount of the thermoplastic resin, particularly, a matrix resin-soluble thermoplastic resin as described below.

Examples of the thermoplastic resin include a matrix resin-soluble thermoplastic resin and a matrix resin-insoluble thermoplastic resin. The matrix resin-soluble thermoplastic resin is a thermoplastic resin which can be partially or entirely dissolved in the matrix resin by heating or the like. Here, the phrase "partly dissolved in the matrix resin" means that when 10 parts by mass of thermoplastic resin having an average particle diameter of 1 to 50 μm is mixed with 100 parts by mass of the matrix resin and stirred at 190° C. for 1 hour, the particles disappear or the size of the particles is changed by 10% or more. The matrix resin-insoluble thermoplastic resin means a thermoplastic resin that is not substantially dissolved in the matrix resin at a temperature equal to or lower than a molding temperature of FRP. That is, the matrix resin-insoluble thermoplastic resin means a thermoplastic resin of which a particle size is not changed by 10% or more when 10 parts by mass of a thermoplastic resin having an average particle diameter of 1 to 50 μm is mixed with 100 parts by mass of the matrix resin and stirred at 190° C. for 1 hour. Further, generally, the molding temperature of the FRP is 100 to 190° C. In addition, the particle diameter is visually measured with a microscope, and the average particle diameter means an average value of the particle diameters of 100 particles randomly selected.

When the matrix resin-soluble thermoplastic resin is not completely dissolved, the matrix resin-soluble thermoplastic resin can be heated and dissolved in the matrix resin during a curing process of the matrix resin composition, such that the viscosity of the matrix resin composition can be increased. This makes it possible to prevent a flow of the matrix resin composition (a phenomenon in which the resin composition flows out from the inside of the prepreg) due to a decrease in viscosity in the curing process.

[Matrix Resin-Soluble Thermoplastic Resin]

The matrix resin-soluble thermoplastic resin is preferably a resin dissolved in the matrix resin to an extent of 80 mass % or more at a curing temperature of the matrix resin.

For example, in the case of using an epoxy resin as the matrix resin, specific examples of the matrix resin-soluble thermoplastic resin include polyethersulfone, polysulfone, polyetherimide, polycarbonate and the like. One of them may be used alone or a combination of two or more thereof may also be used.

It is preferable that the matrix resin-soluble thermoplastic resin has a reactive group having reactivity with the matrix resin or a functional group forming a hydrogen bond. The matrix resin-soluble thermoplastic resin as described above can improve dissolution stability during the curing process of the matrix resin. Further, it is possible to impart toughness, chemical resistance, heat resistance and moist-heat resistance to FRP obtained after curing.

For example, in the case of using an epoxy resin as the matrix resin, a hydroxyl group, a carboxylic acid group, an imino group, an amino group and the like are preferable as the reactive group having reactivity with the matrix resin. It is more preferable to use hydroxyl group-terminated polyethersulfone in that impact resistance, fracture toughness and solvent resistance of the obtained FRP are particularly excellent.

A content of the matrix resin-soluble thermoplastic resin contained in the matrix resin composition is appropriately adjusted depending on the viscosity of the matrix resin. In view of processability of the prepreg, the content of the matrix resin-soluble thermoplastic resin is preferably 5 to 100 parts by mass, more preferably 5 to 50 parts by mass, and further more preferably 10 to 40 parts by mass based on 100 parts by mass of the matrix resin.

A form of the matrix resin-soluble thermoplastic resin is not particularly limited, but the matrix resin-soluble thermoplastic resin is preferably in a particulate form. A particulate matrix resin-soluble thermoplastic resin can be uniformly blended in the resin composition. Further, moldability of the obtained prepreg is high. The matrix resin-soluble thermoplastic resin has an average particle diameter of preferably 1 to 50 μm and more preferably 3 to 30 μm.

[Matrix Resin-Insoluble Thermoplastic Resin]

The matrix resin composition may contain the matrix resin-insoluble thermoplastic resin in addition to the matrix resin-soluble thermoplastic resin. According to the present invention, it is preferable that the matrix resin composition contains both the matrix resin-soluble thermoplastic resin and the matrix resin-insoluble thermoplastic resin.

A part of the matrix resin-insoluble thermoplastic resin or matrix resin-soluble thermoplastic resin (epoxy resin-soluble thermoplastic resin that is not dissolved but remains in the matrix resin after curing) is in a state in which the particles thereof are dispersed in the matrix resin of FRP (hereinafter, the dispersed particles as described above are also referred to as "interlayer particles"). The interlayer particles suppress propagation of impact that the FRP receives. As a result, impact resistance of the obtained FRP is improved.

For example, in the case of using an epoxy resin as the matrix resin, examples of the matrix resin-insoluble thermoplastic resin include polyamide, polyacetal, polyphenylene oxide, polyphenylene sulfide, polyester, polyamideimide, polyimide, polyether ketone, polyether ether ketone, polyethylene naphthalate, polyether nitrile, and polybenzimidazole. Among them, polyamide, polyamideimide, and polyimide are preferable in that they have high toughness and heat resistance. Polyamide or polyimide is particularly excellent in an effect of improving toughness on the FRP. One of them may be used alone or a combination of two or more thereof may also be used. Further, a copolymer thereof can also be used.

Particularly, the heat resistance of the obtained FRP can be especially improved by using amorphous polyimide or polyamide such as nylon 6 (registered trademark) (polyamide obtained by a ring-opening polycondensation reaction of caprolactam), nylon 12 (polyamide obtained by a ring-opening polycondensation reaction of lauryl lactam), amorphous nylon (also referred to as transparent nylon, nylon in which crystallization of a polymer does not occur, or a crystallization rate of a polymer is extremely slow).

A content of the matrix resin-insoluble thermoplastic resin contained in the matrix resin composition is appropriately adjusted depending on the viscosity of the matrix resin composition. In view of processability of the prepreg, the content of the matrix resin-insoluble thermoplastic resin is preferably 5 to 60 parts by mass, and more preferably 15 to 40 parts by mass, based on 100 parts by mass of the matrix resin. A preferable average particle diameter and form of the matrix resin-insoluble thermoplastic resin are the same as those of the matrix resin-soluble thermoplastic resin.

[Other Conductive Materials]

If necessary, the matrix resin composition may contain a conductive material in a matrix resin of the fiber layer or the like in addition to the conductive material disposed on the surface of the prepreg. As the conductive material, the same conductive material as the above-mentioned conductive material can be used. A blending amount of the conductive material is preferably 0.0001 to 20 parts by mass, more preferably 0.0005 to 10 parts by mass, and particularly preferably 0.001 to 5 parts by mass based on 100 parts by mass of a base resin contained in the matrix resin composition.

[Other Additives]

If necessary, the matrix resin composition may appropriately contain, in addition to the above-mentioned components, various additives such as acid anhydride, Lewis acid, a basic curing agent such as dicyandiamide (DICY) or imidazoles, a urea compound, an organic metal salt, a reaction diluent, a filler, an antioxidant, a flame retardant, a pigment and the like, as long as the object and effects of the present invention are not inhibited.

Specific examples of the acid anhydride include phthalic anhydride, trimellitic anhydride, pyromellitic anhydride, and the like. Examples of the Lewis acid include boron trifluoride salts, and more specifically, $BF_3$ monoethylamine, $BF_3$ benzylamine and the like. Examples of imidazoles include 2-ethyl-4-methylimidazole, 2-ethylimidazole, 2,4-dimethylimidazole and 2-phenylimidazole. In addition, as the urea compound, 3-[3,4-dichlorophenyl]-1,1-dimethylurea (DCMU) can be exemplified, and as the organic metal salt, Co[III]acetylacetonate or the like can be exemplified. Examples of the reactive diluents include polypropylene diglycol diglycidyl ether, phenyl glycidyl ether and the like.

Next, a method of preparing the prepreg is described below.

(1-5) Method of Preparing Matrix Resin Composition

A method of preparing the matrix resin composition is not particularly limited, and any method known in the art may be used. For example, when an epoxy resin is used as the matrix resin, a kneading temperature applied during preparing the resin composition may be in a range of 10 to 160° C. When the kneading temperature exceeds 160° C., thermal deterioration of the epoxy resin and a partial curing reaction start, and storage stability of the obtained resin composition and the prepreg prepared using the resin composition may decrease in some cases. When the kneading temperature is lower than 10° C., a viscosity of an epoxy resin composition is high, such that it may be difficult to substantially knead the epoxy resin composition. The kneading temperature is in a range of preferably 20 to 130° C., and more preferably 30 to 110° C.

As a kneading machine device, a kneading machine device known in the art can be used. Specific examples thereof include a roll mill, a planetary mixer, a kneader, an extruder, a Banbury mixer, a mixing container equipped with stirring blades, a horizontal mixing tank, and the like. Kneading of each component can be carried out in the air or an inert gas atmosphere. In the case in which the kneading is carried out in the air, an environment in which a temperature and a humidity are controlled is preferable. Although not particularly limited, for example, it is preferable that the kneading is carried out at a temperature controlled at a constant temperature of 30° C. or less or in a low humidity environment at a relative humidity of 50% RH or less.

(1-6) Method of Preparing Prepreg

The prepreg of the present invention is obtained by impregnating the matrix resin composition in a gap of each fiber substrate constituting the reinforcing fiber substrate. A content of the resin is preferably 15 to 60 mass %, based on a total mass of the prepreg. When the content is less than 15 mass %, voids and the like may be generated in the obtained composite material, such that mechanical properties may be deteriorated. When the content is more than 60 mass %, a reinforcing effect by the reinforcing fiber is insufficient, such that in some cases, mechanical properties relative to mass may be substantially deteriorated. The content is preferably 20 to 50 mass % and more preferably 25 to 50 mass %.

Here, when the matrix resin is an epoxy resin, the content of the resin can be obtained from a ratio calculated from an amount of mass change occurring when the prepreg is immersed in sulfuric acid and heated as needed and thus mass is decreased due to decomposition of the epoxy resin.

More specifically, first, the prepreg is cut into 100 mm×100 mm to manufacture a test piece, and a mass thereof is measured. Then, the test piece of the prepreg was immersed and boiled in sulfuric acid, thereby decomposing and eluting a resin component. Thereafter, the remaining fibers is filtered, washed with sulfuric acid, and dried, and a mass of the dried fiber is measured. Finally, the content of the resin is calculated from a mass change before and after decomposition in sulfuric acid.

A form of the prepreg is not particularly limited as long as the matrix resin composition is impregnated in the reinforcing fiber substrate, but it is preferable that the prepreg is composed of the fiber layer made of the reinforcing fibers and the matrix resin composition impregnated between the reinforcing fibers and a resin layer coated on the surface of the fiber layer. A thickness of the resin layer is preferably 2 to 100 μm. The thickness of the resin layer is more preferable 5 to 50 μm, and particularly preferably 10 to 40 μm.

In the present invention, a method of impregnating the matrix resin composition in the reinforcing fiber substrate to be integrated with each other is not particularly limited, and any method known in the art can be adopted. Specifically, a hot melt method or a solvent method can be appropriately adopted. Among them, the hot melt method is preferably used.

The hot melt method is a method of applying the abovementioned matrix resin composition on a release paper in a thin film form to form a resin composition film, delaminating the formed film from the release paper to obtain the resin composition film, laminating the resin composition film on the reinforcing fiber substrate, and heating the laminated resin composition film under pressure to impregnate the resin composition in the reinforcing fiber substrate.

A method of forming the resin composition into the resin composition film is not particularly limited, but any method known in the art can be used. In detail, the resin composition film can be obtained by casting resin composition on a support such as release paper or a film using a die extruder, an applicator, a reverse roll coater, a comma coater or the like. A resin temperature at the time of manufacturing the film is appropriately determined depending on a composition or viscosity of the resin for manufacturing the film. For example, the resin temperature at the time of manufacturing the film can be in a range of 10 to 160° C. When the resin temperature exceeds 160° C., thermal degradation or a partial curing reaction of the resin composition may start, such that storage stability of the prepreg may be deteriorated. When the resin temperature is lower than 10° C., a viscosity of the resin composition is high, such that it may be difficult to manufactured the film. The resin temperature is in a range of preferably 20 to 130° C., and more preferably 30 to 110° C.

An impregnation pressure at the time of impregnating the matrix resin composition in the reinforcing fiber substrate using the resin composition film is appropriately determined in consideration of the viscosity of the resin composition, resin flow, and the like. The number of times of impregnation is not limited to one time, but the impregnation can be performed several times at an arbitrary pressure and temperature in a multistage manner.

When the epoxy resin is used as the matrix resin and the epoxy resin composition film is impregnated in the reinforcing fiber substrate by the hot melt method, an impregnation temperature is preferably in a range of 50 to 150° C. The impregnation temperature is more preferably 60 to 145° C., and particularly preferably 70 to 140° C.

(1-7) Method of Forming Conductive Part

In the prepreg of the present invention, the conductive part is formed on one surface or both surfaces of the fiber layer. A method of forming the conductive part is not particularly limited, but a method known in the art can be used. In detail, there are a method of spraying the abovementioned conductive material A on the surface of the prepreg; a method of adhering release paper on which the conductive material A is disposed or a resin film containing the conductive material A on the surface of the prepreg; a method using a conductive paste containing the conductive material A; and the like.

In the present invention, for example, the conductive part disposed on the surface of the fiber layer can be formed by disposing a conductive paste containing a conductive filler on the surface of the prepreg. In the present invention, the conductive paste refers to a product obtained by dispersing the conductive material A in a dispersion material such as a resin or the like. As the dispersion material for dispersing the conductive material A, a solvent or a resin (binder resin) can be used. It is preferable to use a resin having compatibility with the matrix resin, and it is more preferable to the same resin as the matrix resin. In the case of using the resin having compatibility with the matrix resin, the binder resin contained in the conductive paste can form a continuous phase with the matrix resin of the resin layer. Since the binder resin contained in the conductive paste forms the continuous phase with the matrix resin of the resin layer, destruction in a boundary region between the conductive paste and the matrix resin is suppressed, thereby improving mechanical properties of the composite material.

When a solvent is used as the dispersion material, it is preferable to remove the solvent after disposing the conductive paste. Further, when a resin is used as the dispersion material, it is preferable to use a curable resin such as a thermosetting resin, a UV curing resin or the like.

In addition, when the curable resin is used as the binder resin of the conductive paste, it is also preferable to dispose the curable resin in a semi-cured (B-stage) state on the prepreg. It is possible to prevent the conductive material A from diffusing into the matrix resin around the conductive paste by disposing the conductive paste on the surface of the prepreg in a state in which the conductive material A is dispersed in a B-stage resin, thereby making it possible to more precisely dispose the conductive part. Furthermore, a B-stage resin composition can react with the matrix resin thereabout at the time of manufacturing the composite material. For this reason, the binder resin of the conductive paste and the matrix resin can be integrated with each other to form a continuous phase.

A volume resistivity of the conductive paste is preferably $10^3$ Ωcm to $10^{-9}$ Ωcm, more preferably 1 Ωcm to $10^{-9}$ Ωcm, and further more preferably $10^{-2}$ Ωcm to $10^{-9}$ Ωcm. Further, the conductive material A contained in the conductive paste is disposed preferably at a blending amount at which a volume occupation ratio is 20 to 95 vol %.

In the case of using the conductive paste in forming the conductive parts, a method of directly disposing the conductive paste on the surface of the prepreg at a predetermined interval to form conductive parts; a method of adhering a resin film on which the conductive paste is disposed at a predetermined interval to the surface of the prepreg; a method of disposing the conductive paste on a matrix resin film used at the time of impregnating the matrix resin in the fiber substrate at a predetermined interval to integrate the matrix resin and the fiber substrate with each other, and the like may be used. As a method of disposing the conductive paste on the resin film, there area method of disposing the conductive paste on a support such as release paper or the like at a predetermined interval and then casting a resin to form a resin film; a method of casting a resin on a support to manufacture a resin film, and then disposing the conductive paste on the film at a predetermined interval; a method of adhering a film on which the conductive paste is disposed at a predetermined interval to the resin film; a method of disposing the conductive paste on a support at a predetermined interval and transferring the conductive paste disposed on the support film to a resin film, and the like.

When the conductive paste is disposed on the resin film, the support or the film, the conductive paste may be disposed on these films by a method such as a screen printing method, an inkjet printing method or an application method using a dispenser. Alternatively, these films may be perforated and filled with the conductive paste.

In the case of forming the conductive part by transfer, a support for transfer is not particularly limited, but the support is preferably a planar body having releasability, for example, release paper containing a releasing agent such as a silicone type releasing agent, a release film such as a fluororesin film or the like.

The prepreg of the present invention obtained by using the method as de scribed above is laminated, molded and cured according to the purpose, thereby manufacturing a composite material. A method of manufacturing the composite material is known. With the prepreg obtained by using the present invention, the fiber-reinforced composite material of the present invention, having both excellent conductivity and mechanical properties can be obtained.

2. Surface-Modified Reinforcing Fiber (2-1) Surface-Modified Reinforcing Fiber

A surface-modified reinforcing fiber of the present invention is composed of a reinforcing fiber and an organometallic complex and/or an organometallic complex pyrolysate adhered to a surface of the reinforcing fiber.

The reinforcing fiber used in the present invention is not particularly limited, but carbon fiber, glass fiber, aramid fiber, polyester fiber, ceramic fiber, alumina fiber, boron fiber, silicon carbide fiber, mineral fiber, metal fiber, rock fiber, slag fiber, and the like can be used as the reinforcing fiber. In order to improve conductivity of the obtained fiber-reinforced composite material, it is preferable that the reinforcing fiber is a conductive fiber. Examples of the conductive fiber include the carbon fiber, the silicon carbide fiber and the metal fiber.

Among these reinforcing fibers, carbon fiber is preferable in that it is possible to obtain the fiber-reinforced composite material having a light weight and high strength while having good specific strength and specific elastic modulus. Particularly, polyacrylonitrile (PAN) based carbon fiber is preferable in view of excellent tensile strength.

In the case of using the PAN based carbon fiber, a tensile elastic modulus thereof is preferably 100 to 600 GPa, more preferably 200 to 500 GPa, and further more preferably 230 to 450 GPa. Further, tensile strength thereof is 2000 MPa to 10000 MPa, preferably 3000 to 8000 MPa. A diameter of the carbon fiber is preferably 4 to 20 μm, and more preferably 5 to 10 μm. Mechanical properties of the obtained fiber-reinforced composite material can be improved by using the carbon fiber as described above.

The organometallic complex used in the present invention is a metal complex that forms an organometallic complex pyrolysate by thermal decomposition. A thermal decomposition temperature is preferably 200° C. or less, more preferably 80 to 200° C., and further more preferably 100 to 160° C. The thermal decomposition is performed in the above-mentioned temperature range, such that the organometallic complex adhered to the reinforcing fiber is thermally decomposed by heating during molding, and a metal corresponding to the organometallic complex pyrolysate can be formed on the surface of the reinforcing fiber.

Examples of the metal constituting the organometallic complex include platinum, gold, silver, copper, tin, nickel, titanium, cobalt, zinc, iron, chromium and aluminum, but silver is preferable in that it is possible to obtain high conductivity. An organic silver complex is not particularly limited, but examples thereof include the following organic silver complexes.

Examples of the organic silver complex include organic silver complexes obtained by reacting a silver compound represented by the following Chemical Formula (1)

[Chemical Formula 1]

$$Ag_nX \qquad \text{Chemical Formula (1)}$$

(In Chemical Formula (1), n is an integer of 1 to 4, and X is oxygen, sulfur, halogen, cyano, cyanate, carbonate, nitrate, nitrite, sulfate, phosphate, thiocyanate, chlorate, perchlorate, tetrafluoroborate, acetylacetonate and carboxylate.)

Following Chemical Formulas (2) to (4)

[Chemical Formula 2]

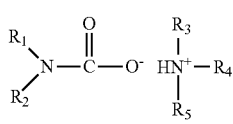

Chemical Formula (2)

[Chemical Formula 3]

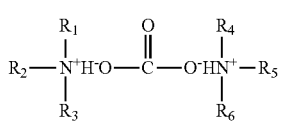

Chemical Formula (3)

[Chemical Formula 4]

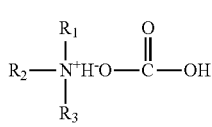

Chemical Formula (4)

With one or more ammonium carbamate based compounds or ammonium carbonate based compounds selected from compounds represented by Chemical Formulas (2) to (4).

(In Chemical Formulas (2) to (4), $R_1$ to $R_6$ are individually a hydrogen, an aliphatic alkyl group having 1 to 30 carbon atoms, an aliphatic aryl group, an alicyclic alkyl group, an alicyclic aryl group, an aralkyl group corresponding to a mixture thereof, an alkyl group and aryl group having a substituent, a heterocyclic compound group, a polymer compound group or a derivative thereof. $R_1$ to $R_6$ may be the same as or different from each other.)

Examples of the silver compound represented by Chemical Formula (1) include silver oxide, silver thiocyanate, silver sulfide, silver chloride, silver cyanide, silver cyanate, silver carbonate, silver nitrate, silver nitrite, silver sulfate, silver phosphate, silver perchlorate, silver tetrafluoroborate, silver acetylacetonate, silver acetate, silver lactate, silver oxalate and derivatives thereof. It is preferable to use silver oxide and silver carbonate.

Examples of $R_1$ to $R_6$ in Chemical Formulas (2) to (4) include hydrogen, methyl, ethyl, propyl, isopropyl, butyl, isobutyl, amyl, hexyl, ethylhexyl, heptyl, octyl, isooctyl, nonyl, decyl, dodecyl, hexadecyl, octadecyl, docodecyl, cyclopropyl, cyclopentyl, cyclohexyl, allyl, hydroxy, methoxy, hydroxyethyl, methoxyethyl, 2-hydroxypropyl, methoxypropyl, cyanoethyl, ethoxy, butoxy, hexyloxy, methoxyethoxyethyl, methoxyethoxyethoxy ethyl, hexamethyleneimine, morpholine, piperidine, piperazine, ethylenediamine, propylenediamine, hexamethylenediamine, triethylenediamine, pyrrole, imidiazole, pyridine, carboxymethyl, trimethoxysilylpropyl, triethoxysilylpropyl, phenyl, methoxyphenyl, cyanophenyl, phenoxy, tolyl, benzyl and derivatives thereof, polymer compound groups such as polyallylamine and polyethyleneimine and derivatives thereof, and the like.

Examples of the ammonium carbamate based compound or the ammonium carbonate based compound represented by Chemical Formula (1) include ammonium carbamate, ammonium carbonate, ammonium bicarbonate, ethyl ammonium ethyl carbamate, isopropyl ammonium isopropyl carbamate, n-butyl ammonium n-butyl carbamate, isobutyl ammonium isobutyl carbamate, t-butyl ammonium t-butyl carbamate, 2-ethylhexyl ammonium 2-ethylhexyl carbamate, octadecyl ammonium octadecyl carbamate, 2-methoxyethyl ammonium 2-methoxyethyl carbamate, 2-cyanoethyl ammonium 2-cyanoethyl carbamate, dibutyl ammonium dibutyl carbamate, dioctadecyl ammonium dioctadecyl carbamate, methyl decyl ammonium methyl decylcarbamate, hexamethyleneimine ammonium hexamethyleneimine carbamate, morpholinium morpholine carbamate, pyridinium ethyl hexyl carbamate, triethylenediaminium isopropyl bicarbamate, benzyl ammonium benzyl carbamate, triethoxysilylpropyl ammonium triethoxysilylpropyl carbamate, ethyl ammonium ethyl carbonate, isopropyl ammonium isopropyl carbonate, isopropyl ammonium bicarbonate, n-butyl ammonium n-butyl carbonate, isobutyl ammonium isobutyl carbonate, t-butyl ammonium t-butyl carbonate, t-butyl ammonium bicarbonate, 2-ethylhexyl ammonium 2-ethylhexyl carbonate, 2-ethylhexyl ammonium bicarbonate, 2-methoxyethyl ammonium 2-methoxyethyl carbonate, 2-methoxyethyl ammonium bicarbonate, 2-cyanoethyl ammonium 2-cyanoethyl carbonate, 2-cyanoethyl ammonium bicarbonate, octadecyl ammonium octadecyl carbonate, dibutyl ammonium dibutyl carbonate, dioctadecyl ammonium dioctadecyl carbonate, dioctadecyl ammonium bicarbonate, methyldecyl ammonium methyldecyl carbonate, hexamethyleneimine ammonium hexamethyleneimine carbonate, morpholine ammonium morpholine carbonate, benzyl ammonium benzyl carbonate, triethoxysilylpropyl ammonium triethoxysilylpropyl carbonate, pyridinium bicarbonate, triethylenediaminium isopropyl carbonate, triethylenediaminium bicarbonate and derivatives thereof, and the like.

A method of preparing the organic silver complex as described above is known and is described, for example, in Jpn. PCT National Publication No. 2014-516463. As the organic silver complex as described above, a commercially available product can also be used. As commercially available products, an organic silver complex thermally decomposed in the above-mentioned temperature range can be selected from various complex silver inks manufactured by Ink Tech Company Limited.

An amount of the organometallic complex and/or the organometallic complex pyrolysate adhered to the reinforcing fiber is preferably less than 8 mass %, more preferably less than 1 mass %, and further more preferably 0.5 mass %, particularly preferably less than 0.25 mass %, and most preferably less than 0.2 mass % based on the mass of the reinforcing fiber. A lower limit of an adhesion amount of the organometallic complex and/or the organometallic complex pyrolysate is not particularly limited, but may be preferably 0.01 mass % or more, more preferably 0.02 mass % or more, further more preferably 0.03 mass % or more, and particularly preferably 0.04 mass % or more. When the adhesion amount is more than 8 mass %, an effect of improving conductivity relative to an adhesion amount of the conductive substance becomes small, which is not preferable in view of economical efficiency. When the adhesion amount is less than 0.01 mass %, the effect of improving conductivity may be decreased.

The fiber-reinforced composite material composed of the reinforcing fiber layer made of the surface-modified reinforcing fiber of the present invention and the matrix resin composition exhibits high conductivity even though an amount of the used conductive substance is small. The fiber-reinforced composite material using the surface-modified reinforcing fiber of the present invention has a low volume resistivity in a direction perpendicular to the reinforcing fiber layer, that is, in the thickness direction, thereby making it possible to obtain a fiber-reinforced composite material having a volume of 8 Ω·cm or less.

The fiber-reinforced composite material has a volume resistivity of $1.0 \times 10^{-7}$ to 8 Ω·cm, preferably $1.0 \times 10^{-6}$ to 6 Ω·cm, and more preferably $1.0 \times 10^{-6}$ to 4 Ω·cm in the direction perpendicular to the reinforcing fiber layer, that is, the thickness direction.

(2-2) Method of Manufacturing Surface-Modified Reinforcing Fiber

The surface-modified reinforcing fiber of the present invention is manufactured by adhering an aqueous solution containing the organometallic complex (hereinafter, also referred to as "complex aqueous solution") to the reinforcing fiber and then drying the resultant.

A complex concentration of the complex aqueous solution is not particularly limited, but it is preferably 0.1 to 100 g/L, and more preferably 1 to 50 g/L. When the complex concentration is less than 0.1 g/L, an amount of the organometallic complex adhered to the reinforcing fiber is excessively small, such that it is difficult to impart sufficient conductivity. The complex concentration is more than 100 g/L, which is not preferable in view of economical efficiency.

The complex aqueous solution can also be used as a sizing agent for collecting reinforcing fibers. In this case, the organometallic complex can be added to a sizing agent known in the art to thereby be used.

If necessary, the reinforcing fiber to which the complex aqueous solution is adhered is dehydrated and then dried. A drying temperature is not particularly limited. The organometallic complex adhered to the reinforcing fiber may be partially or entirely pyrolyzed in the drying process. Further, the organometallic complex may be pyrolyzed by providing a heat treatment process after the drying process. Alternatively, the organometallic complex may be pyrolyzed by heating at the time of molding the fiber-reinforced composite material described below. In addition, the organometallic complex does not necessarily have to be finally pyrolyzed.

Adhesion of the complex aqueous solution to the reinforcing fiber may be carried out in a state of single fiber or fiber bundle, or may be carried out after forming a fiber reinforced substrate described below.

A method of adhering the complex aqueous solution to the reinforcing fiber is not particularly limited, but for example, there are a method of immersing the reinforcing fiber in a bath of the complex aqueous solution and a method of spraying the complex aqueous solution onto the reinforcing fiber.

A method of drying the complex aqueous solution adhere to the reinforcing fiber is not particularly limited, but for example, a drying method using cold air or hot air, a natural drying method, a vacuum drying method, and a drying method by a contact with a heat roller may be used.

3. Fiber-Reinforced Composite Material

The fiber-reinforced composite material of the present invention can be manufactured by a conventionally known method of laminating the prepreg of the present invention and molding and curing the laminated prepreg according to the object. As a method of manufacturing the composite material, for example, a method of using manual lay-up, automated tape lay-up (ATL), automated fiber placement, vacuum bagging, autoclave curing, curing other than autoclave, fluid assisted process, pressure assisted process, match mold process, simple press curing, press cave curing, or continuous band press is applied.

The fiber-reinforced composite material has a volume resistivity of $1.0 \times 10^{-7}$ to 8 Ω·cm, preferably $1.0 \times 10^{-6}$ to 6 Ω·cm, and more preferably $1.0 \times 10^{-6}$ to 4 Ω·cm in the direction perpendicular to the reinforcing fiber layer, that is, the thickness direction.

In the fiber-reinforced composite material, a content of the matrix resin composition is preferably 15 to 60 mass %, based on a total mass of the fiber-reinforced composite material. When the content is less than 15 mass %, voids and the like may be generated in the obtained fiber-reinforced composite material, such that mechanical properties may be deteriorated. When the content is more than 60 mass %, a reinforcing effect by the reinforcing fiber is insufficient, such that in some cases, mechanical properties relative to mass may be substantially deteriorated. The content is preferably 20 to 50 mass % and more preferably 25 to 50 mass %.

Since the fiber-reinforced composite material obtained as described above has excellent conductivity and can suppress damage by a discharge, the fiber-reinforced composite material can be applied to many applications requiring electromagnetic shielding, electrostatic protection, current return, and conductivity. In particular, the fiber-reinforced composite material can be used to solve electromagnetic problems in aerospace parts, wind turbines, pressure vessels, buildings, ships, trains, automobiles, fuel tanks and other fields.

EXAMPLE

Hereinafter, the present invention will be described in more detail through Examples, but the present invention is not limited thereto. Components and test methods used in this Examples and Comparative Examples are described below.

[Component]
[Reinforcing Fiber Substrate]
CF-1: carbon fiber strand "Tenax" IMS60 (trade name)
  Tensile strength: 5800 MPa, tensile elastic modulus: 290 GPa, number of filaments: 12000
CF-2: metal-coated carbon fiber strand "Tenax" HTS40 MC (trade name)
  Tensile strength: 2900 MPa, tensile elastic modulus: 230 GPa, coating metal: nickel
[Organometallic Complex]
Organic silver complex paste: [TEC-PA-010 (trade name) manufactured by Ink Tech Company Limited]
[Epoxy Resin Composition]
(Epoxy Resin)
Glycidyl amine type epoxy resin (trifunctional group) [Araldite MY0600 (trade name) manufactured by Huntsman Advanced Materials Corp.] (MY0600)
Glycidyl amine type epoxy resin (tetrafunctional group) [Araldite MY721 (trade name) manufactured by Huntsman Advanced Materials Corp.] (MY721)
(Epoxy Resin Curing Agent)
4,4'-diaminodiphenylsulfone [aromatic amine curing agent manufactured by Wakayama Seika Kogyo Co., Ltd.] (4,4'-DDS)

(Thermoplastic Resin)
Thermoplastic resin A
Polyether sulfone having an average particle diameter of 20 μm [PES-5003P (trade name) manufactured by Sumitomo Chemical Co., Ltd.] (thermoplastic resin soluble in epoxy resin)
Thermoplastic resin B
Grilamid having an average particle diameter of 20 μm [TR-55 (trade name) manufactured by EMS-CHEMIE Japan Ltd.](thermoplastic resin insoluble in epoxy resin)
[Conductive Material]
(Conductive Paste)
Silver paste: conductive adhesive for electronics, GA-6278 (trade name) manufactured by Sanyu Rec Co., Ltd. (conductive material A: fine silver particles (average particle diameter: 2 μm), dispersing material: epoxy resin, volume resistivity: $5 \times 10^{-4}$ Ωcm)
(Conductive Material B)
Silver-coated silica particle, TFM S02P (average particle diameter: 2 μm (catalog value)) [manufactured by Toyo Aluminum K.K. Co. Ltd]
Graphite BF-3AK (average particle diameter: 3 μm (catalog value)) [manufactured by Chuetsu Graphite Works Co., Ltd.]
[Measurement Method]
(1) Measurement of Thickness of Fiber Layer
After cutting the prepreg, a laminate having a laminated structure $[+45/0/-45/90]_{2S}$ was obtained. The laminate was molded under a pressure of 0.49 MPa at 180° C. for 120 minutes using an autoclave. A cross section of the molded body was polished using a sand paper until carbon fiber was exposed to a surface of the molded product. Finally, surface finishing was performed using a #2000 sand paper, thereby obtaining a test piece. The obtained test piece was enlarged by 300 times with a microscope, a thickness of the fiber layer was measured at 30 points, and an average value thereof was taken as the thickness (t) of the fiber layer.
(2) Measurement of Volume Resistivity in Z Direction
In the present invention, electrical resistance of the fiber layer and the laminate was evaluated by using the volume resistivity in a Z direction (thickness direction). Volume resistivity is specific resistivity of a given material. A measurement unit of conductivity of a three-dimensional material is ohm-cm (Ωcm). The volume resistivity ρ of the material in the Z direction is usually defined by the following Equation.

$$\rho = RA/d$$

R: electrical resistance value of test piece (measured using a digital ohmmeter)
d: thickness (m) of test piece
A: cross-sectional area ($m^2$) of test piece
In the present invention, the volume resistivity was measured only in the Z direction (thickness direction of the composite material). In calculations, since thickness was always taken into consideration, in all cases, this value was "volume" resistivity.
(Method of Preparing Test Sample for Measuring Volume Resistivity of Fiber Layer in Z Direction)
After cutting 1 ply (1 layer) of the prepreg, the cut prepreg was molded by heating in an autoclave at 180° C. for 120 minutes under a pressure of 0.49 MPa. The obtained molded product was cut into a size of 40 mm (width)×40 mm (length), and a surface of the molded product was polished using a sand paper until carbon fiber was exposed. Finally, surface finishing was performed using a #2000 sand paper, thereby obtaining a test piece. A resin layer on the surface of the prepreg was removed by polishing treatment as described above, and the volume resistivity of the fiber layer in the thickness direction was measured. The obtained test piece was sandwiched between two gold-plated electrodes having a width of 50 mm and a length of 50 mm.

In a state in which a load of 0.06 MPa was applied between both electrodes, the resistance value of the test piece in the Z direction was measured using a digital ohmmeter (AX-114N manufactured by ADEX Co., Ltd.), and the volume resistivity was obtained by using the above-mentioned Equation. The resistance values of 10 test pieces were measured, the volume resistivity was calculated, and the average value thereof was used for evaluation.
(Method of Preparing Test Sample For Measuring Volume Resistivity of Laminate in Z Direction)
The prepreg was cut and laminated, such that a laminate having a laminated structure $[+45/0/-45/90]_{2S}$ was obtained. The laminate was molded at 180° C. for 120 minutes under a pressure of 0.49 MPa using a vacuum autoclave molding method. The obtained molded product was cut into a size of 40 mm (width)×40 mm (length), and a surface of the molded product was polished using a sand paper until carbon fiber was exposed. Finally, surface finishing was performed using a #2000 sand paper, thereby obtaining a test piece. The obtained test piece was sandwiched between two gold-plated electrodes having a width of 50 mm and a length of 50 mm.
In a state in which a load of 0.06 MPa was applied between both electrodes, the resistance value of the test piece in the Z direction was measured using a digital ohmmeter (AX-114N manufactured by ADEX Co., Ltd.), and the volume resistivity was obtained by using the above-mentioned Equation. The resistance values of 10 test pieces were measured, the volume resistivity was calculated, and the average value thereof was used for evaluation.
(3) Method of Measuring Average Interval of Conductive Parts
After cutting the prepreg, a resin film was further laminated on both surfaces of the cut prepreg, thereby obtaining a laminate. The laminate was molded under a pressure of 0.49 MPa at 180° C. for 120 minutes using an autoclave. A surface of the molded body was magnified 20 times and observed with an optical microscope. A plane was divided into 4 quadrants every 90 degrees centered on a randomly extracted conductive part and a distance to an adjacent conductive part at the closest distance for each quadrant was measured. Similarly, the distances from four adjacent conductive parts per 30 conductive parts were measured, and an arithmetic average value thereof was taken as the average interval L of the conductive parts.
(4) Method of Measuring Edge Glow Discharge
After cutting the prepreg, a laminate having a laminated structure $[+45/0/-45/90]_{3S}$ was obtained. The obtained laminate was cut into a size of 360 mm×50 mm, and then molded under an environment of a pressure of 0.49 MPa and a temperature of 180° C. for 120 minutes using an autoclave.
Electrodes were passed through the center and both ends of the obtained molded plate, currents of 20 kA and 30 kA were allowed to flow from an electrode in a central portion, respectively, and the presence or absence of light emission by a discharge from a side surface of the test piece was visually confirmed.
(5) Adhesion Amount of Conductive Substance on Modified Reinforcing Fiber
A mass $W_1$ of the fiber before adhering the conductive substance and a mass $W_2$ thereof after adhering the conductive substance were measured, and an adhesion amount of the conductive material was calculated by the following Equation.

Adhesion amount[mass %]=$(W_2-W_1)/W_2 \times 100$

Example 1

A screen printing plate in which dot-shaped (circular) openings having a diameter of 50 μm were arranged in a lattice pattern at intervals of 0.32 cm in width and length directions, respectively, was prepared. As the conductive material A, a silver paste containing fine silver particles was printed on an FEP film using a vacuum printer VPES-HAIV manufactured by Sanyu Rec Co., Ltd. A pressure at the time of printing was 100 KPa, and a clearance was 1 mm. After printing, the resultant was dried at 120° C. for 120 minutes. A shape of the conductive paste after printing was a hemisphere having a diameter of 40 μm and a height of 30 μm.

Next, 10 parts by mass of polyether sulfone 5003P (thermoplastic resin A) corresponding to a soluble thermoplastic resin was added to 50 parts by mass of MY0600 and 50 parts by mass of MY721 corresponding to epoxy resins in a kneading device and stirred at 120° C. for 30 minutes using a stirrer to completely dissolve the thermoplastic resin A, thereby preparing an epoxy resin composition. Subsequently, the prepared epoxy resin composition was coated on a release film using a film coater, thereby obtaining a resin film for a surface layer (resin basis weight: 10 g/m$^2$). The FEP film on which the conductive paste was screen-printed was adhered to a surface of the obtained resin film for the surface layer so that a printed surface was in contact with the epoxy resin composition. Thereafter, the FEP film was peeled off, and the conductive paste was transferred to the resin film for the surface layer. After the transferring, the conductive paste retained the shape of the hemisphere.

Next, 10 parts by mass of the thermoplastic resin A was newly added to 50 parts by mass of MY600 and 50 parts by mass of MY721, and the mixture was stirred using a stirrer at 120° C. for 30 minutes to completely dissolve the thermoplastic resin A. Then, a resin temperature was cooled to 80° C. or less. Thereafter, 30 parts by mass of a thermoplastic resin B was kneaded and 45 parts by mass of 4,4'-DDS was kneaded, thereby preparing an epoxy resin composition. The prepared resin composition was coated on release paper using a film coater, thereby preparing a resin film (40 g/m$^2$) for impregnation.

Then, CF-1 as a reinforcing fiber strand was immersed in an aqueous solution in which 2.5 mass % of silver-coated silica particles were mixed as a conductive material B, and the conductive material B was adhered to the fiber surface. An adhesion amount of the conductive material on the reinforcing fiber was 2 wt %. The reinforcing fibers to which the conductive material B was adhered were aligned in one direction, thereby preparing a reinforcing fiber substrate with a fiber basis weight of 190 g/m$^2$. A resin film for impregnation was adhered to both surfaces of the obtained reinforcing fiber substrate, and the resin composition was impregnated in the fiber substrate by a hot melt method, thereby preparing a primary prepreg. The resin film for the surface layer to which conductive paste was transferred was adhered to both surfaces of the obtained primary prepreg so that the conductive paste was in contact with the fiber substrate, thereby preparing a prepreg.

A test sample for measuring a volume resistivity of the fiber layer was molded using the prepared prepreg, and conductivity thereof was evaluated. The volume resistivity (ρ) of the fiber layer was 5 Ωcm. Further, a thickness of the fiber layer was measured to be 190 μm.

Evaluation results of a composite material (laminate) manufactured by using the prepreg obtained in Example 1 are shown in Table 1. In Example 1 in which the value of Equation (1) was 1.19, an edge glow discharge did not occur when a current of 20 kA was applied.

Examples 2 and 3 and Comparative Example 1

A prepreg and a laminate were prepared in the same manner as in Example 1 except for changing a size and an interval of the dots of the screen printing plate, a diameter of the conductive parts, and an interval L of the conductive parts as in values in Table 1 without changing the blending amount of the conductive material A and the fiber layer. Evaluation results of the obtained laminate are shown in Table 1. In both Examples 2 and 3 in which the value of Equation (1) was more than 0.5, an edge glow discharge did not occur when a current of 20 kA was applied.

On the contrary, in Comparative Example 1 in which the value of Equation (1) was 0.25, although the same amount of the conductive material A was added and the same fiber layer was used, an edge glow discharge occurred by a current of 20 kA.

Examples 4 and 5 and Comparative Example 2

A prepreg and a laminate were prepared in the same manner as in Example 1 except for changing an interval of the screen printing plate and the interval L of the conductive parts as in the values in Table 1. Evaluation results of the obtained laminate are shown in Table 1. In both Examples 4 and 5 in which the value of Equation (1) was more than 0.5, an edge glow discharge did not occur when a current of 20 kA was applied.

On the contrary, in Comparative Example 2 in which the value of Equation (1) was 0.38, an edge glow discharge occurred at a current of 20 kA.

Comparative Example 3

A prepreg and a laminate were prepared in the same manner as in Example 1 except that the conductive material B was not adhered to the reinforcing fiber. Since the conductive material B was not adhered to the reinforcing fiber, a volume resistivity (ρ) of the fiber layer was 100 Ωcm, which was higher than that in Example 1.

Evaluation results of the obtained laminate are shown in Table 1. In Comparative Example 3 in which the value of Equation (1) was 0.06, an edge glow discharge occurred at a current of 20 kA.

Example 6

A prepreg and a laminate were prepared in the same manner as in Example 1 except that the amount of the conductive material B adhered to the reinforcing fiber was changed to 0.5 mass %. A volume resistivity (ρ) of the fiber layer was 10 Ωcm, which was slightly higher than that in Example 1.

Evaluation results of the obtained laminate are shown in Table 2. In Example 6 in which the value of Equation (1) was 0.59, an edge glow discharge did not occur at a current of 20 kA.

Example 7

A prepreg and a laminate were prepared in the same manner as in Comparative Example 3 except for using CF-2 corresponding to a metal-coated carbon fiber as the reinforcing fiber instead of CF-1. Since the metal-coated carbon fiber was used as the reinforcing fiber, a volume resistivity (ρ) of the fiber layer was decreased to 3.5 Ωcm.

Evaluation results of the obtained laminate are shown in Table 2. In Example 7 in which the value of Equation (1) was 1.70, an edge glow discharge did not occur at a current of 20 kA.

Example 8

A prepreg and a laminate were prepared in the same manner as in Example 1 except that using graphite as the conductive material B adhered to the reinforcing fiber instead of the silver-coated silica particles. A volume resistivity (ρ) of the fiber layer was 10 Ωcm, which was slightly higher than that in Example 1.

Evaluation results of the obtained laminate are shown in Table 2. In the laminate of Example 8 in which the value of Equation (1) was 0.59, an edge glow discharge did not occur at a current of 20 kA.

Comparative Example 4 and Examples 9 and 10

A prepreg and a laminate were prepared in the same manner as in Example 1 except for changing the basis weight of the reinforcing fiber substrate and the thickness of the fiber layer.

Evaluation results of the obtained laminate are shown in Table 2. In both the laminates of Examples 9 and 10 in which the value of Equation (1) was more than 0.5, an edge glow discharge did not occur at a current of 20 kA.

On the contrary, in the laminate of Comparative Example 4 in which the value of Equation (1) was 0.47, in spite of low volume resistivity of CFRP in the thickness direction, an edge glow discharge occurred at a current of 20 kA.

Example 11

A resin film (resin basis weight: 10 g/m$^2$) for a surface layer to which a conductive paste was transferred was obtained in the same manner as in Example 1.

Next, 10 parts by mass of a thermoplastic resin A was newly added to 50 parts by mass of MY600 and 50 parts by mass of MY721, and the mixture was stirred using a stirrer at 120° C. for 30 minutes to completely dissolve the thermoplastic resin A. Then, a resin temperature was cooled to 80° C. or less. Thereafter, 30 parts by mass of a thermoplastic resin B and 10 parts by mass of silver-coated silica particles were kneaded, and 45 parts by mass of 4,4'-DDS was further kneaded, thereby preparing an epoxy resin composition. The prepared resin composition was coated on release paper using a film coater, thereby preparing a resin film (40 g/m$^2$) for impregnation.

Subsequently, CF-1 to which the conductive material B was not adhered were aligned in one direction as reinforcing fiber strands, thereby preparing a reinforcing fiber substrate with a fiber basis weight of 190 g/m$^2$. The resin film for impregnation was adhered to both surfaces of the obtained reinforcing fiber substrate, and the resin composition was impregnated in the fiber substrate by a hot melt method, thereby preparing a primary prepreg. The resin film for the surface layer to which conductive paste was transferred was adhered to both surfaces of the obtained primary prepreg so that the conductive paste was in contact with the fiber substrate, thereby preparing a prepreg.

A test sample for measuring a volume resistivity of the fiber layer was molded using the prepared prepreg, and conductivity thereof was evaluated. A volume resistivity ρ of the fiber layer was 10 Ωcm.

Evaluation results of the obtained laminate are shown in Table 2. In Example 11 in which a value of Equation (1) was 0.59, an edge glow discharge did not occur when a current of 20 kA was applied.

Example 12

In a kneading device, 10 parts by mass of polyether sulfone 5003P (thermoplastic resin A) corresponding to a soluble thermoplastic resin was added to 50 parts by mass of MY0600 and 50 parts by mass of MY721 corresponding to epoxy resins and stirred at 120° C. for 30 minutes using a stirrer to completely dissolve the thermoplastic resin A, thereby preparing an epoxy resin composition. Subsequently, the prepared epoxy resin composition was applied on a release film using a film coater, thereby obtaining a resin film for a surface layer (resin basis weight: 10 g/m$^2$). The conductive paste was freeze-pulverized and sprayed on a surface of the resin film for a surface layer.

Subsequently, a resin film for impregnation and a reinforcing fiber substrate were prepared in the same manner as in Example 1. A resin film for impregnation was adhered to both surfaces of the obtained reinforcing fiber substrate, and the resin composition was impregnated in the fiber substrate by a hot melt method, thereby preparing a primary prepreg. The resin film for the surface layer on which conductive paste was sprayed was adhered to both surfaces of the obtained primary prepreg so that the conductive paste was in contact with the fiber substrate, thereby preparing a prepreg.

Evaluation results of the obtained laminate are shown in Table 2. In the laminate of Example 12 in which a value of Equation (1) was 1.19, an edge glow discharge did not occur when a current of 20 kA was applied.

TABLE 1

| | | | Example 1 | Example 2 | Example 3 | Comp. Example 1 | Example 4 | Example 5 | Comp. Example 2 | Comp. Example 3 |
|---|---|---|---|---|---|---|---|---|---|---|
| Fiber layer | Volume resistivity (ρ) | Ωcm | 5 | 5 | 5 | 5 | 5 | 5 | 5 | 100 |
| | Thickness (t) | μm | 190 | 190 | 190 | 190 | 190 | 190 | 190 | 190 |
| Resin layer | Blending amount of conductive material A | mass % | 0.014 | 0.014 | 0.014 | 0.014 | 0.120 | 0.004 | 0.00141 | 0.014 |
| | interval of conductive parts (L) | cm | 0.32 | 0.44 | 0.63 | 1.5 | 0.11 | 0.60 | 1.0 | 0.32 |

TABLE 1-continued

|  |  | Example 1 | Example 2 | Example 3 | Comp. Example 1 | Example 4 | Example 5 | Comp. Example 2 | Comp. Example 3 |
|---|---|---|---|---|---|---|---|---|---|
| Diameter of conductive parts | μm | 40 | 55 | 80 | 180 | 40 | 40 | 40 | 40 |
| t/ρ × 1/L × 100 |  | 1.19 | 0.87 | 0.60 | 0.25 | 3.54 | 0.63 | 0.38 | 0.06 |
| FRP volume resistivity | Ωcm | 14 | 14 | 15 | 13 | 14 | 17 | 18 | 180 |
| Edge glow discharge | 20 kA | Not occurred | Not occurred | Not occurred | Occurred | Not occurred | Not occurred | Occurred | Occurred |
|  | 30 kA | Not occurred | Not occurred | Occurred | Occurred | Not occurred | Occurred | Occurred | Occurred |

TABLE 2

|  |  |  | Example 6 | Example 7 | Example 8 | Comp. Example 4 | Example 9 | Example 10 | Example 11 | Example 12 |
|---|---|---|---|---|---|---|---|---|---|---|
| Fiber layer | Volume resistivity (ρ) | Ωcm | 10 | 3.5 | 10 | 5 | 5 | 9 | 10 | 5 |
|  | Thickness (t) | μm | 190 | 190 | 190 | 75 | 120 | 380 | 190 | 190 |
| Resin layer | Blending amount of conductive material A | mass % | 0.014 | 0.014 | 0.014 | 0.014 | 0.014 | 0.004 | 0.0014 | 0.014 |
|  | interval of conductive parts (L) | cm | 0.32 | 0.32 | 0.32 | 0.32 | 0.32 | 0.32 | 0.32 | 0.32 |
|  | Diameter of conductive parts | μm | 40 | 40 | 40 | 50 | 40 | 40 | 40 | 40 |
| t/ρ × 1/L × 100 |  |  | 0.59 | 1.70 | 0.59 | 0.47 | 0.75 | 1.32 | 0.59 | 1.19 |
| FRP volume resistivity | Ωcm |  | 17 | 9 | 17 | 15 | 15 | 19 | 20 | 14 |
| Edge glow discharge | 20 kA |  | Not occurred | Not occurred | Not occurred | Occurred | Not occurred | Not occurred | Not occurred | Not occurred |
|  | 30 kA |  | Occurred | Not occurred | Occurred | Occurred | Occurred | Not occurred | Occurred | Not occurred |

Example 13

A polyacrylonitrile (PAN) fiber (single fiber fineness: 1.2 dtex, number of filaments: 24000) as a precursor fiber was subjected to flame-resistant treatment at 250° C. in the air until a specific gravity of the fiber became 1.35, then subjected to low-temperature carbonization at a maximum temperature of 500° C. under a nitrogen atmosphere. Thereafter, carbon fiber prepared by high-temperature carbonization at a high temperature of 1300° C. under a nitrogen atmosphere was subjected to surface treatment by electrolytic oxidation using 10 mass % of ammonium sulfate aqueous solution with an electric quantity of 20 C/g, thereby obtaining a unsized carbon fiber bundle (tensile strength: 5000 MPa, tensile elastic modulus: 250 GPa, carbon content: 98 mass %, number of filaments: 24000, total fineness: 1,600 tex).

To the obtained unsized surface-modified carbon fiber bundle, 1.0 mass % of an epoxy based sizing agent was adhered.

Next, the obtained carbon fiber bundle was immersed in a bath of an organic silver complex aqueous solution (silver complex concentration: 15 g/L), and then dried to prepare a surface-modified carbon fiber bundle. An adhesion amount of the organic silver complex (including decomposed product) was 0.1 mass %.

Thereafter, the surface-modified carbon fiber bundle was aligned in one direction to prepare a surface-modified carbon fiber substrate (basis weight: 190 g/m²).

In a kneading device, 10 parts by mass of a thermoplastic resin was added to 50 parts by mass of MY600 and 50 parts by mass of MY721, and the mixture was stirred using a stirrer at 120° C. for 30 minutes to completely dissolve the thermoplastic resin. Then, a resin temperature was cooled to 80° C. or less. Thereafter, 45 parts by mass of 4,4'-DDS was kneaded to prepare an epoxy resin composition. The prepared resin composition was coated on release paper using a film coater, thereby preparing a matrix resin film (50 g/m²).

The matrix resin film was adhered to both surfaces of the surface-modified carbon fiber substrate, and the resin composition was impregnated in the reinforcing fiber substrate by a hot melt method, thereby preparing a prepreg.

A test sample for measuring a volume resistivity was molded using the prepared prepreg, and conductivity of a fiber-reinforced composite material was evaluated. An electric resistance of the obtained fiber-reinforced composite material was 1.6 Ω·cm.

Example 14

A prepreg and a fiber-reinforced composite material were prepared in the same manner as in Example 13 except for changing the silver complex concentration of the organic silver complex aqueous solution and preparing a surface-modified carbon fiber bundle having an adhesion amount as illustrated in Table 3, and conductivity thereof was evaluated.

Reference Example 1

In Reference Example 1, a prepreg was obtained by mixing the same amount of the organometallic complex as in Example 14 with a matrix resin composition by the following method instead of adhering the organometallic complex to the carbon fiber bundle.

An unsized carbon fiber bundle was prepared in the same manner as in Example 13.

After adhering 1.0 mass % of an epoxy based sizing agent to the obtained unsized carbon fiber bundle, the carbon fiber bundle was aligned in one direction, thereby obtaining a carbon fiber substrate (basis weight: 190 g/m²) on which a conductive substance was not adhered.

In a kneading device, 10 parts by mass of a thermoplastic resin and 0.2 parts by mass of an organic silver complex were added to 50 parts by mass of MY600 and 50 parts by mass of MY721, and the mixture was stirred using a stirrer at 120° C. for 30 minutes to completely dissolve the thermoplastic resin. Then, a resin temperature was cooled to 80° C. or less. Thereafter, 45 parts by mass of 4,4'-DDS was kneaded to prepare an epoxy resin composition. The prepared resin composition was coated on release paper using a film coater, thereby preparing a matrix resin film (50 g/m²).

The matrix resin film was adhered to both surfaces of the carbon fiber substrate, and the resin composition was impregnated in the reinforcing fiber substrate by a hot melt method, thereby preparing a prepreg. An addition amount of the organometallic complex added based on the mass of the carbon fiber in the prepreg is shown in Table 3.

A test sample for measuring a volume resistivity was molded using the prepared prepreg, and conductivity of a fiber-reinforced composite material was evaluated. Evaluation results are shown in Table 1.

Example 15

A prepreg and a laminate were prepared in the same manner as in Example 1 except that the surface-modified reinforcing fiber obtained in Example 13 was used as a reinforcing fiber strand. A volume resistivity (ρ) of the fiber layer was 1.6 Ωcm as mentioned above and was lower than that in Example 1.

Evaluation results of the obtained laminate are shown in Table 4. In the laminate of Example 15 in which a value of Equation (1) was 3.7, an edge glow discharge did not occur at a current of 20 kA.

Example 16

A prepreg and a laminate were prepared in the same manner as in Example 1 except that the surface-modified reinforcing fiber obtained in Example 14 was used as a reinforcing fiber strand. A volume resistivity (ρ) of the fiber layer was 2.3 Ωcm as mentioned above and was lower than that in Example 1.

Evaluation results of the obtained laminate are shown in Table 4. In the laminate of Example 16 in which the value of Equation (1) was 2.6, an edge glow discharge did not occur at a current of 20 kA.

TABLE 4

| | | | Example 15 | Example 16 |
|---|---|---|---|---|
| Fiber layer | Volume resistivity (ρ) | Ωcm | 1.6 | 2.3 |
| | Thickness (t) | μm | 190 | 190 |
| Resin layer | Blending amount of conductive material A | mass % | 0.014 | 0.014 |
| | interval of conductive parts (L) | cm | 0.32 | 0.32 |
| | Diameter of conductive parts | μm | 40 | 40 |
| | $t/\rho \times 1/L \times 100$ | | 3.7 | 2.6 |
| FRP volume resistivity | | Ωcm | 5.2 | 5.0 |
| Edge glow discharge | | 20 kA | Not occurred | Not occurred |
| | | 30 kA | Not occurred | Not occurred |

TABLE 3

| | Example 13 | Example 14 | Comp. Example 3 | Example 1 | Example 6 | Reference Example 1 |
|---|---|---|---|---|---|---|
| Conductive material | Silvercomplex | Silvercomplex | Absence | Silver-coated SiO₂ | Silver-coated SiO₂ | Silver complex |
| Application method | Immersing carbon fiber bundle in aqueous solution | Immersing carbon fiber bundle in aqueous solution | — | Immersing carbon fiber bundle in aqueous solution | Immersing carbon fiber bundle in aqueous solution | Mixing with matrix resin |
| Adhesion amount (addition amount) of conductive substance based on CF (mass %) | 0.1 | 0.08 | — | 2.0 | 0.5 | 0.08 |
| Volume resistivity of fiber layer (Ω·cm) | 1.6 | 2.3 | 100 | 5.0 | 10 | 9.6 |

The invention claimed is:

1. A prepreg comprising:
    at least reinforcing fibers; and
    a matrix resin,
    wherein a volume resistivity (ρ) of the fiber layer in the thickness direction is 50 (Ω·cm) or less,
    conductive parts are formed on one surface or both surfaces of a fiber layer made of the reinforcing fibers, and
    a volume resistivity ρ (Ω·cm) of the fiber layer in a thickness direction, a thickness t (cm) of the fiber layer and an average interval L (cm) of the conductive parts formed on the surface of the fiber layer satisfy the following Equation (1):

$$t/\rho \times 1/L \times 100 \geq 0.5 (\Omega^{-1} \cdot cm^{-1})$$ Equation (1), wherein the average interval L is 0.025 (cm) or more, and each conductive part of the conductive parts is formed such that intervals between the conductive parts are in a range within ±50% of the average interval L.

2. The prepreg according to claim 1, wherein the reinforcing fiber is a reinforcing fiber in which a conductive material is adhered to a fiber surface.

3. The prepreg according to claim 1, wherein the fiber layer is a fiber layer composed of at least the reinforcing fiber and a conductive material existing between single fibers of the reinforcing fiber.

4. A fiber-reinforced composite material comprising: at least reinforcing fibers and a matrix resin,
wherein conductive parts are formed between layers formed by laminating fiber layers made of the reinforcing fibers, and
a volume resistivity $\rho$ ($\Omega \cdot cm$) of the fiber layer in a thickness direction, a thickness t (cm) of the fiber layer and an average interval L (cm) of the conductive parts formed on the surface of the fiber layer satisfy the following Equation (1):

$$t/\rho \times 1/L \times 100 \geq 0.5 (\Omega^{-1} \cdot cm^{-1})$$ Equation (1), wherein the average interval L is 0.025 (cm) or more.

* * * * *